(12) United States Patent
Cherrette

(10) Patent No.: US 12,132,564 B2
(45) Date of Patent: Oct. 29, 2024

(54) HIGH-DATA-RATE DISTRIBUTION NETWORK FOR LEO CONSTELLATIONS

(71) Applicant: LOCKHEED MARTIN CORPORATION, Bethesda, MD (US)

(72) Inventor: Alan Cherrette, Highlands Ranch, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/748,669

(22) Filed: Jan. 21, 2020

(65) Prior Publication Data

US 2021/0226694 A1 Jul. 22, 2021

(51) Int. Cl.
| | |
|---|---|
| *H04B 7/185* | (2006.01) |
| *B64G 1/10* | (2006.01) |
| *H04B 7/19* | (2006.01) |
| *H04B 7/195* | (2006.01) |
| *H04B 10/112* | (2013.01) |

(Continued)

(52) U.S. Cl.
CPC ....... *H04B 7/18554* (2013.01); *B64G 1/1007* (2013.01); *B64G 1/1085* (2013.01); *H04B 7/18515* (2013.01); *H04B 7/1858* (2013.01); *H04B 7/19* (2013.01); *H04B 7/195* (2013.01); *H04B 10/112* (2013.01);
(Continued)

(58) Field of Classification Search
CPC ............ H04B 7/18554; H04B 7/18515; H04B 7/1858; H04B 10/112; H04B 10/118; B64G 1/1007; H04Q 11/0066; H04Q 2011/0092
See application file for complete search history.

(56) References Cited

U.S. PATENT DOCUMENTS

| | | |
|---|---|---|
| 5,410,728 A | 4/1995 | Bertiger et al. |
| 5,722,042 A | 2/1998 | Kimura et al. |

(Continued)

*Primary Examiner* — Steven S Kelley

(57) ABSTRACT

A high data rate distribution network for low-earth orbit (LEO) satellite constellations is described. The high data rate distribution network includes multiple LEO constellations, each constellation including a number of LEO spacecraft orbiting in a LEO plane that are all connected together by by-directional free space optical links. The distribution network further includes geostationary earth orbit (GEO) spacecraft in communication with a number of ground gateways. The GEO spacecraft can receive forward communication traffic including radio-frequency (RF) and/or optical data streams uplinked from the ground gateways and can convert the received forward communication traffic into a forward aggregated traffic. The GEO spacecraft can further optically downlink the forward aggregated traffic to LEO spacecraft in a LEO constellation that is in line of sight of the GEO spacecraft. The forward aggregated traffic is then disaggregated among and received by the LEO spacecraft in the LEO constellation. Return communication traffic from each LEO spacecraft can also be aggregated into a return aggregated traffic from the LEO constellation. The return aggregated traffic is optically uplinked to a GEO spacecraft by a LEO spacecraft of the LEO constellation that is in line of sight of the GEO spacecraft. The GEO spacecraft converts the received return aggregate traffic into multiple RF and/or optical data streams that are down linked to a number of ground gateways.

10 Claims, 14 Drawing Sheets

(51) Int. Cl.
*H04B 10/118* (2013.01)
*H04Q 11/00* (2006.01)

(52) U.S. Cl.
CPC ....... *H04B 10/118* (2013.01); *H04Q 11/0066* (2013.01); *H04Q 2011/0092* (2013.01)

(56) References Cited

U.S. PATENT DOCUMENTS

| | | | |
|---|---|---|---|
| 6,078,810 A | 6/2000 | Olds et al. | |
| 6,545,787 B1* | 4/2003 | Lenormand | H04B 7/18521 398/121 |
| 7,103,280 B1* | 9/2006 | Ionov | H04B 10/118 398/118 |
| 10,128,949 B2* | 11/2018 | Boroson | H04B 10/60 |
| 10,419,106 B1 | 9/2019 | Liu et al. | |
| 10,432,308 B1 | 10/2019 | Turgeon et al. | |
| 11,171,720 B1* | 11/2021 | Uthaman | H04B 7/18584 |
| 2002/0077099 A1* | 6/2002 | LaPrade | H04B 7/18578 455/430 |
| 2005/0286896 A1* | 12/2005 | Kinoshita | H04J 14/0283 398/83 |
| 2014/0016941 A1* | 1/2014 | Coleman | H04B 7/18521 398/121 |
| 2014/0341586 A1 | 11/2014 | Wyler | |
| 2015/0318916 A1* | 11/2015 | Gopal | H04B 7/18539 455/13.1 |
| 2015/0381267 A1* | 12/2015 | Tronc | H04B 7/18521 370/320 |
| 2016/0204861 A1* | 7/2016 | Boroson | H04B 10/1121 398/96 |
| 2018/0227054 A1* | 8/2018 | Hreha | H04J 14/02 |
| 2018/0254824 A1* | 9/2018 | Speidel | H04B 7/18521 |
| 2019/0007127 A1* | 1/2019 | Ward | H04B 17/3912 |
| 2021/0092640 A1* | 3/2021 | Ravishankar | H04W 28/0967 |

* cited by examiner

HIGH-DATA-RATE DISTRIBUTION NETWORK FOR LEO CONSTELLATIONS

STATEMENT REGARDING FEDERALLY SPONSORED RESEARCH OR DEVELOPMENT

Not applicable.

FIELD OF THE INVENTION

The present invention generally relates to satellite communications technology, and more particularly to a high-data-rate distribution network for low-earth orbit (LEO) constellations.

BACKGROUND

Large LEO constellations generating large amounts of data generally need to route the data quickly through the constellation to a terrestrial destination before the data becomes out of date and of limited value. When data being generated is very large and low latency is crucial, the data must be continuously routed through the constellation to the destination point. Given that the earth is rotating under the LEO constellation, moving this data quickly to the ground without inter-satellite links requires numerous gateway locations spread around the world. Finding suitable landing locations amidst large percentage of oceans and getting appropriate spectrum becomes a very difficult and expensive proposition.

Even with inter-satellite links connecting adjacent satellites, the ground gateway architecture problems persist. Thus, there is a significant problem of finding an affordable LEO satellite constellation system architecture that allows very high-rate satellite data generation with very short latency to a terrestrial destination that does not require expensive and numerous globally distributed gateways with spectrum and landing right issues.

Space communications networks have been developed using LEO satellite constellations where the inter-satellite links connect neighboring satellites (both in-plane and out-of-plane). Such connectivity and routing require complex links, and the capacity of the links forces them to bring the data down into numerous global gateway distribution points with spectrum and landing right issues. The Iridium satellite communications system is one of the earliest examples of the architectural solution described above. Other LEO constellations have used or use the same basic architecture, except with much higher data rates.

SUMMARY

According to various aspects of the subject invention, methods and configurations are disclosed for a high data rate distribution network for low-earth orbit (LEO) satellite constellations.

In one or more aspects, a forward data distribution network for LEO constellations includes a plurality of LEO constellations, each including a plurality of LEO spacecraft orbiting in a LEO plane. The forward data distribution network further includes at least one GEO spacecraft in communication with a plurality of ground gateways. The GEO spacecraft is configured to receive forward communication traffic including radio-frequency (RF) and/or optical data streams uplinked from the ground gateways, it then converts the received forward communication traffic into an forward aggregated traffic, and downlinks the forward aggregated traffic optically to line of sight (LOS) LEO spacecraft of each LEO constellation for being dis-aggregated and distributed to each LEO spacecraft of the plurality of LEO spacecraft orbiting in the LEO constellation.

In yet other aspects, a return data distribution network for LEO constellations includes a plurality of LEO constellations, each including a plurality of LEO spacecraft orbiting in a LEO plane, and at least one GEO spacecraft in communication with a plurality of ground gateways. The LEO spacecraft of a plurality of LEO spacecraft in a LEO constellation are configured to aggregate return communication traffic to a LOS LEO spacecraft in that LEO constellation. The LOS LEO spacecraft of a plurality LEO constellations are configured to transmit the aggregated return communications traffic optically to GEO spacecraft. The GEO spacecraft are configured to receive aggregated return communication traffic and convert it to return traffic including RF and/or optical data streams for being downlinked to a plurality of ground gateways.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1A:
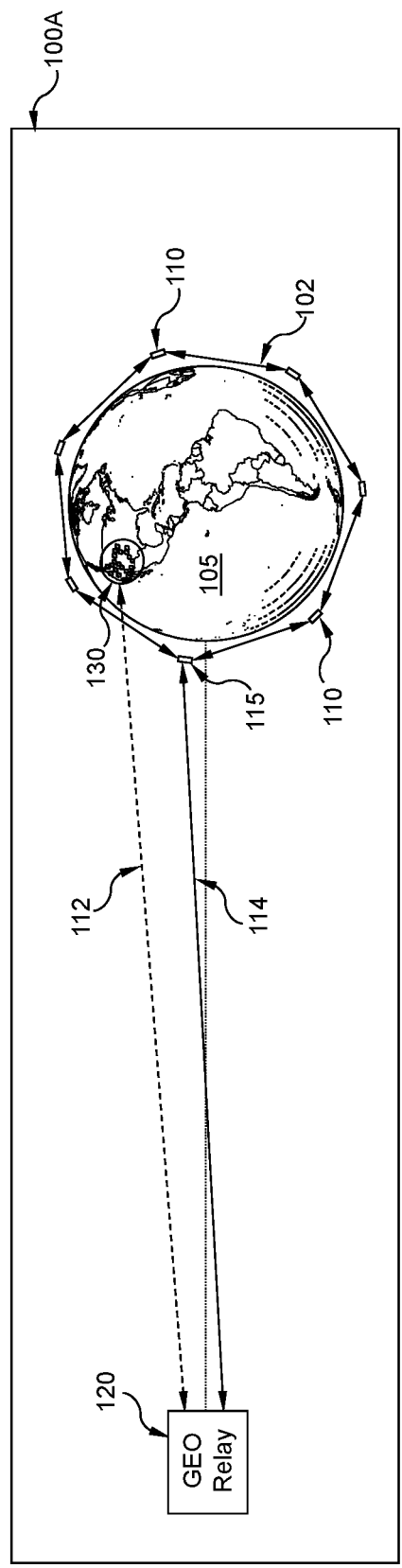
FIGS. 1A and 1B are conceptual diagrams illustrating example systems of optical aggregation and/or disaggregation of communications traffic between low-earth orbit (LEO) and geostationary orbit (GEO) spacecraft for links to the ground, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

Methods and configurations are described for providing a high-data-rate distribution network for low-earth orbit (LEO) constellations. In particular, the subject technology relates to aggregating return communications traffic optically among LEO spacecraft in a LEO constellation in a LEO orbit plane. In one or more implementations, the aggregated return communications traffic is uplinked to a geostationary earth orbit (GEO) spacecraft optically. The GEO spacecraft then converts the received aggregate optical signal into multiple RF and/or optical downlink signals in respective downlink beams for communication to the ground gateways. Ground gateways are high data rate reception and transmission equipment on the Earth that are connected to the terrestrial communication infrastructure. An example of an RF gateway would be a large parabolic reflector antenna with an associated radio transceiver. Return communications traffic is data from the LEO spacecraft that needs to be sent to ground gateways. The return data from the LEO spacecraft can be data generated by remote sensing instruments attached to the LEO spacecraft as is the case for remote sensing applications. The return data from the LEO spacecraft can also be communications traffic from receive antennas on the LEO spacecraft as is the case for communications applications.

According to other aspects of the subject technology, forward communications traffic from the ground is uplinked from multiple gateways in respective isolated radio-frequency (RF) and/or optical beams to GEO spacecraft. The GEO spacecraft then convert the multiple received RF and/or optical data streams into aggregated forward traffic. The GEO spacecraft then downlinks aggregated forward traffic to each LEO constellation optically where the traffic is disaggregated and distributed optically to each LEO spacecraft in the LEO constellation. Forward communications traffic is data from the ground gateway that needs to be sent to the LEO spacecraft. The forward data from the gateway can be commands to remote sensing instruments on a LEO spacecraft as is the case for remote sensing applications. The forward data from the gateway can also be communications traffic for distribution to transmit antennas on a LEO spacecraft as is the case for communications applications.

One of the key features of the present disclosure is the use of GEO spacecraft to relay communications traffic between the gateways on the ground and LEO spacecraft. This architecture allows all the gateways for the LEO constellation to be in a local geographic area such as the western United States. This solves the problem of moving large amounts of low-latency data between a LEO constellation and the ground without requiring expensive and numerous globally distributed gateways with spectrum and landing right issues Another key feature of this invention is aggregating return communications traffic and dis-aggregating forward communications traffic in the constellation of LEO spacecraft. This greatly reduces the number of GEO spacecraft needed to relay the data to and from the ground gateways.

Figure 1B:
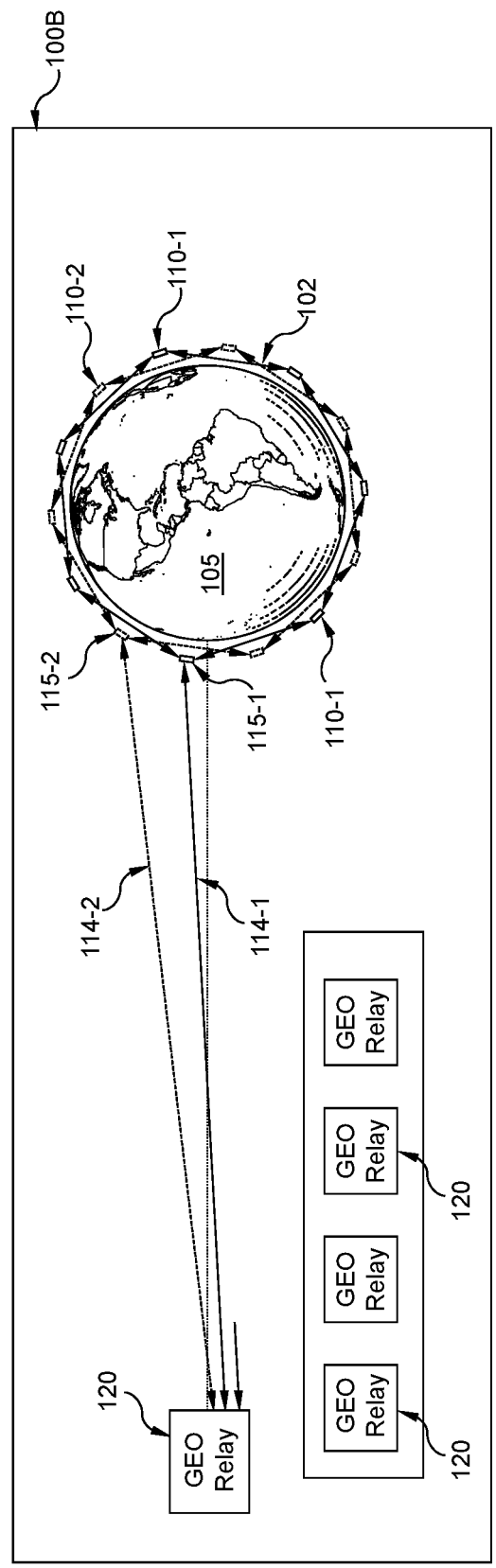

FIGS. 1A and 1B are conceptual diagrams illustrating example systems 100A and 100B of optical aggregation and/or disaggregation of communications traffic between LEO spacecraft 110 and GEO spacecraft 120 for establishing links to the ground, according to certain aspects of the disclosure. The example system 100A includes Earth 105, a plurality of (e.g., seven) LEO spacecraft (e.g., LEO satellites) 110 forming a LEO constellation and a GEO spacecraft (e.g., GEO satellite) 120. The LEO spacecraft 110 of the LEO constellation rotate the Earth 105 in a LEO orbit plane. In some implementations, there can be a plurality (e.g., four) GEO spacecraft 120 supporting a plurality (i.e. 112) LEO spacecraft in a plurality (e.g., sixteen) of LEO constellations. The return communications traffic is optically aggregated among the LEO spacecraft in a LEO constellation, and then the aggregated traffic is uplinked to the GEO spacecraft 120 by a line-of-sight (LOS) link 114 from the LOS LEO spacecraft 115, which at a particular time is in LOS of the GEO spacecraft 120. The LEO spacecraft 110 in a LEO constellation are optically linked via bidirectional optical links 102, which are high-data-rate links (i.e. capable of handling 140 Gbps each way). The GEO spacecraft 120 converts the return aggregated optical traffic onto multiple RF and/or optical data streams that are downlinked to the ground in multiple isolated RF and/or optical transmit beams to respective RF and/or optical gateways 130 (hereinafter, "gateways 130") in one geographical area. The multiple isolated RF and/or optical transmit beams form part of the RF and/or optical link 112 that is a bidirectional link. In one or more implementations, the GEO spacecraft 120 can receive forward communications traffic uplinked by the gateways 130 via the RF and/or optical link 112 and aggregate the forward traffic and downlink the aggregated traffic via LOS optical link 114 to the LOS-LEO spacecraft 115. The forward communications traffic is then dis-aggregated among the LEO spacecraft 110 in a LEO constellation. The gateways can be connected to each other and other networks, for example, by terrestrial fiber-optic links.

The example system 100B is similar to the example system 100A, except that the example system 100B includes a LEO plane consisting of two LEO constellations, each including a plurality (i.e. seven) LEO spacecraft. The first LEO constellation includes seven LEO satellites 110-1, and the second LEO constellation includes seven LEO satellites 110-2. LOS-LEO spacecraft 115-1 and 115-2 of the first and second constellations are in communication with the GEO spacecraft 120. In other words, the return traffic from each of the first and second constellations is separately aggregated and uplinked to the GEO spacecraft 120 via the LOS-LEO links 114-1 and 114-2 from LOS LEO spacecraft 115-1 and 115-2, respectively. Also, forward traffic is downlink from GEO spacecraft 120 to each of first and second constellations, separately, via the LOS-LEO links 114-1 and 114-2 to LOS LEO spacecraft 115-1 and 115-2, respectively.

Figure 2:
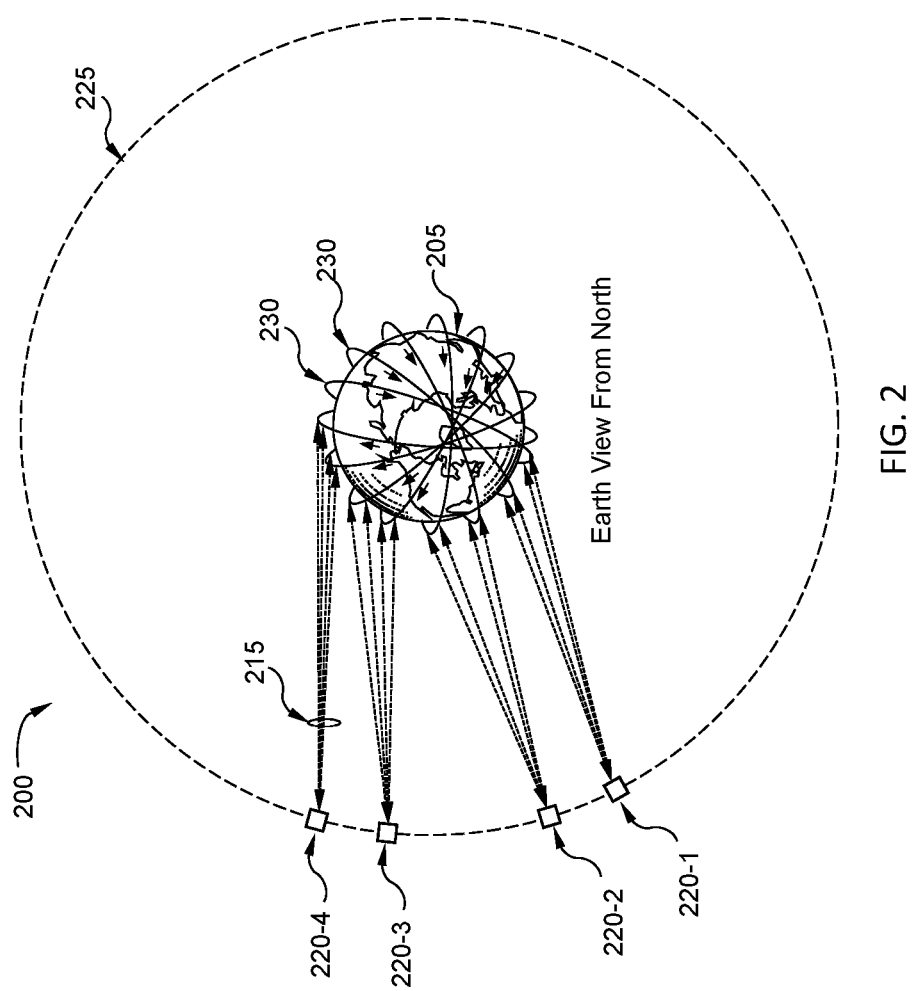
FIG. 2 is a conceptual diagram illustrating a view from north of the earth showing LEO planes and optical links from line of sight LEO spacecraft to GEO spacecraft, according to certain aspects of the disclosure.

FIG. 2 is a conceptual diagram illustrating a view 200 from north of the Earth showing LEO planes and optical links from LOS LEO spacecraft to GEO spacecraft, according to certain aspects of the disclosure. The view 200 depicts four GEO spacecraft 220 (220-1, 220-2, 220-3 and 220-4) in a geostationary orbit 225 of Earth 205. The four GEO spacecraft 220-1, 220-2, 220-3 and 220-4 are positioned at different GEO orbital positions, for example, at 78 degree west (deg. W), 88 deg. W, 111 deg. W and 121 deg. W, respectively. Each GEO spacecraft 220 is in active communication with LOS-LEO spacecraft of one or more (e.g., two) LEO planes 230 of a number of LEO planes (e.g., eight LEO planes) via a number of (e.g., four) LOS optical links 215. Each of the LOS optical links 215 is capable of supporting high data rates (e.g., 140 Gbps) for both forward and return traffic. The arraignment of LEO and GEO spacecraft depicted in FIG. 1B and FIG. 2 contain 4 GEO spacecraft and 112 LEO spacecraft (8 LEO planes with 14 LEO spacecraft per plane). Each LEO spacecraft can transmit return communications at a data rate of about 20 GBPS and can receive forward communications at a data rate of 20 GBPS. As a result, the arraignment of LEO and GEO spacecraft depicted in FIG. 1B and FIG. 2 can accommodate a total maximum return data rate of 2,240 GBPS to the gateways and a total maximum forward data rate of 2,240 GBPS from the gateways. Those skilled in the art will appreciate that the arraignment of LEO and GEO spacecraft depicted in FIG. 1B and FIG. 2 is just an example, and that data rates for the LEO spacecraft, the number of LEO spacecraft per constellation, the number of constellations per LEO orbit plane, the number of LEO orbit planes, the number of GEO spacecraft and the number of ground gateways in a local geographical area can all be varied to meet specific coverage and data communications requirements for LEO constellations.

Figure 3:
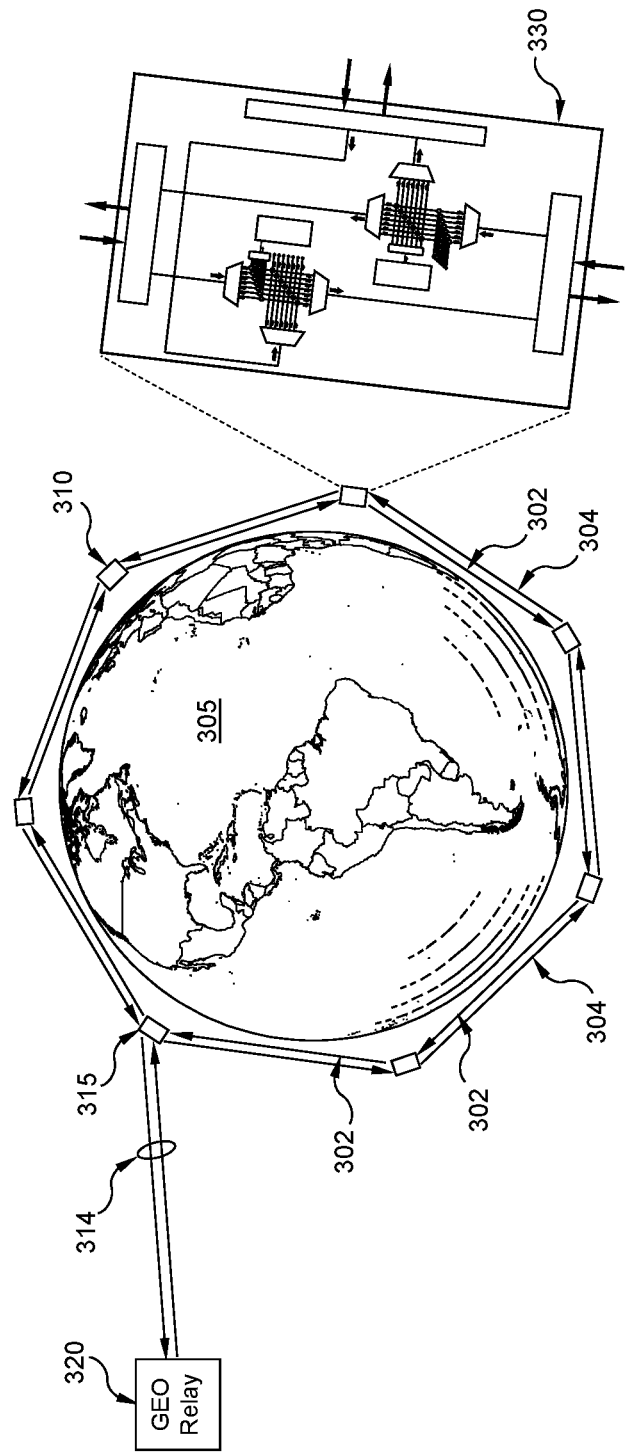
FIG. 3 is a conceptual diagram illustrating GEO- and LEO-constellation traffic and a constellation aggregation and/or disaggregation architecture, according to certain aspects of the disclosure.

FIG. 3 is a conceptual diagram illustrating GEO- and LEO-constellation traffic and a constellation aggregation and/or disaggregation architecture, according to certain aspects of the disclosure. The LEO constellation shown in FIG. 3 includes seven LEO spacecraft 310 of a constellation. The term "constellation" refers to seven of the optically connected spacecrafts in a LEO plane having 14 LEO spacecraft as shown in FIG. 1B. It is assumed for illustrative purposes, that each LEO spacecraft generates a 20 GBPS return data rate and receives a 20 GBPS forward data rate. Therefore, the LEO-to-LEO traffic includes forward traffic 302 and return traffic 304 that are high-data-rate links, each supporting up to about 140 GBPS(=7×20 GBPS).

The forward traffic starts from a ground gateway (e.g., 130 of FIG. 1A) and ends at a respective LEO spacecraft. The return traffic starts from a respective LEO spacecraft and ends at a respective ground gateway that receive the return traffic data from the GEO spacecraft 320. The forward traffic is transmitted by the GEO spacecraft 320 via an optical link 314 and is in communication with the LOS-LEO spacecraft 315. The return traffic 304 is initiated by respective LEO spacecraft 310, return data is forwarded to the LOS-LEO spacecraft 315, and from there to the GEO spacecraft 320 via an optical link 314 for transmission, via an RF and/or optical link, to a ground gateway.

Each of the LEO spacecraft 310 includes an aggregation and/or disaggregation payload architecture 330 that is responsible for LEO spacecraft optical communications with the GEO spacecraft 320 and LEO-to-LEO optical communications, as discussed in more detail below (and shown in FIG. 4A and FIG. 4B).

Figure 4A:
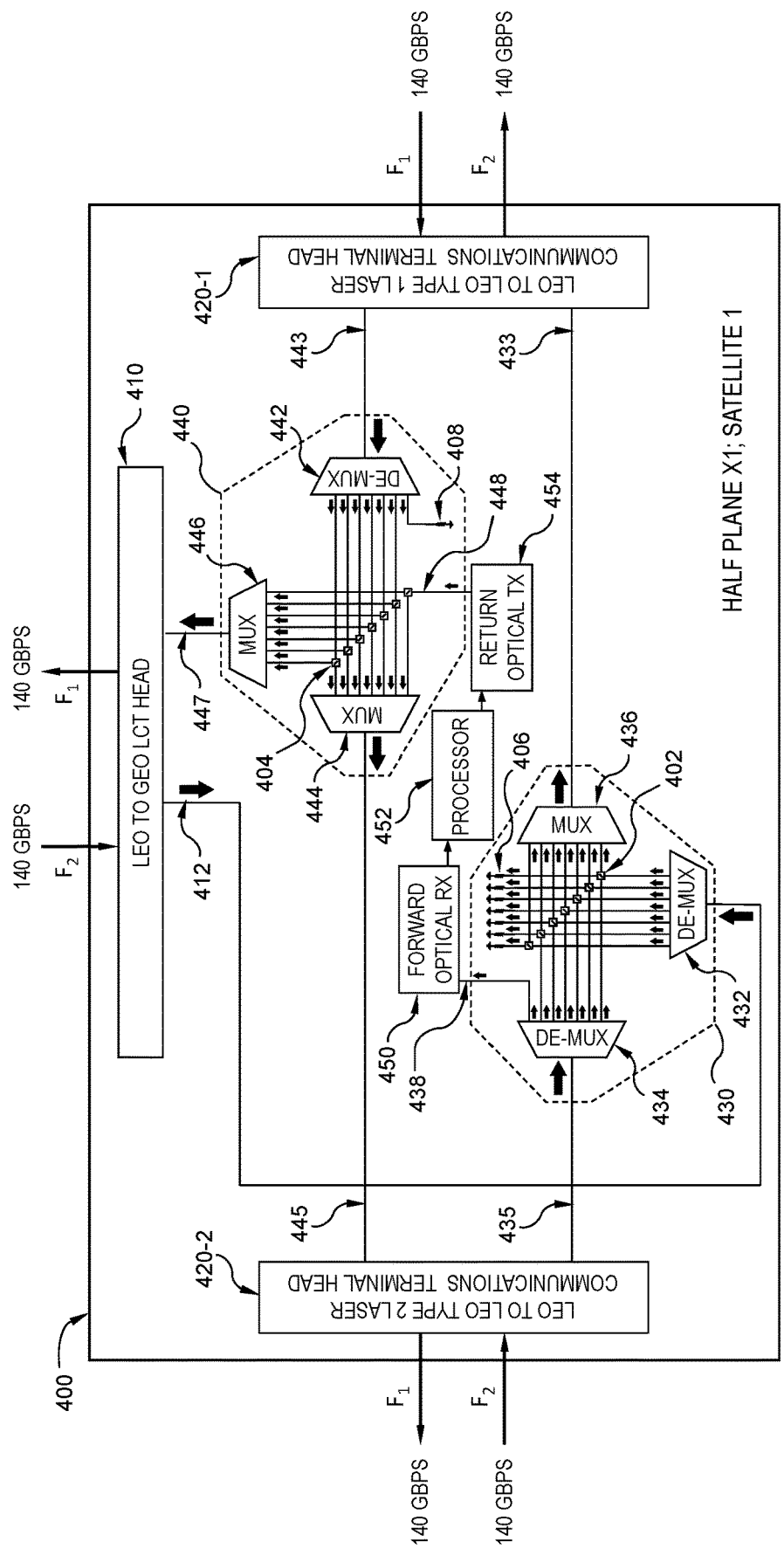
FIG. 4A is a schematic diagram illustrating a LEO spacecraft communications payload laser communications terminal (LCT) connections architecture with optical aggregation and/or disaggregation, according to certain aspects of the disclosure.

FIG. 4A is a schematic diagram illustrating a LEO spacecraft communications payload and a laser communications terminal (LCT) connections architecture 400 with optical aggregation and/or disaggregation, according to certain aspects of the disclosure. The LEO spacecraft LCT connections architecture 400 includes a LEO-to-GEO LCT head 410, a LEO-to-LEO type 1 LCT head 420-1 (hereinafter, "LEO-to-LEO LCT head 420-1"), a LEO-to-LEO type 2 LCT head 420-2 (hereinafter, "LEO-to-LEO LCT head 420-2"), a forward optical ring multiplexer 430, a return optical ring multiplexer 440, a forward optical receive (RX) block 450, a communication processor 452 and a return optical transmit (TX) block 454.

The LEO-to-GEO LCT head 410 receives a forward signal in a frequency band $f_2$ from the GEO spacecraft (when connected) via a free-space optical (FSO) link. The frequency band $f_2$ contains seven wavelengths corresponding to seven LEO spacecraft (satellites) of a constellation. The LEO-to-GEO LCT head 410 amplifies the forward signal and transmits it via a fiber link as a forward signal 412 to the forward optical ring multiplexer 430. The LEO-to-GEO LCT head 410 also receives a return signal 447 from the return optical ring multiplexer 440 and amplifies the return signal 447 and transmits via the FSO link in a frequency band $f_1$ to the GEO spacecraft (when connected). The frequency band $f_1$ also contains seven wavelengths corresponding to seven LEO spacecraft (satellites) of the constellation. Further details related to the structure of LEO-to-GEO LCT head 410 will be discussed below.

The LEO-to-LEO LCT head 420-1 receives a return signal in the frequency band $f_1$ from a first neighboring LEO spacecraft in the LEO constellation and amplifies the return signal and transmits a return signal 443 to the return optical ring multiplexer 440 via a fiber link. The LEO-to-LEO LCT head 420-1 further receives a forward signal 433 from the forward optical ring multiplexer 430 via a fiber link and amplifies the forward signal 433 for transmission in the frequency band $f_2$ to the first neighboring LEO spacecraft.

The LEO-to-LEO LCT head 420-2 receives a forward signal in the frequency band $f_2$ from a second neighboring LEO spacecraft in the LEO constellation and amplifies the forward signal and transmits a forward signal 435 to the forward optical ring multiplexer 430 via a fiber link. The LEO-to-LEO LCT head 420-2 further receives a return signal 445 from the return optical ring multiplexer 440 via a fiber link and amplifies the return signal 445 for transmission in the frequency band $f_1$ to the second neighboring LEO spacecraft in the LEO constellation.

The forward optical ring multiplexer 430 includes optical beam splitters 402, optical demultiplexers (DEMUXes) 432 and 434 and an optical multiplexer (MUX) 436. The optical DEMUX 432 receives the forward signal 412 from the LEO-to-GEO LCT head 410 and separates the seven wavelengths contained in the forward signal 412 into seven optical beams. The optical DEMUX 434 receives the forward signal 435 from the LEO-to-LEO LCT head 420-2 and similarly separates the seven wavelengths contained in the forward signal 435 into another seven optical beams. The seven beams from the optical DEMUX 432 are directed to the seven optical beam splitters 402, where each of the seven beams are split into two sets of seven beams. The first set of seven beams is forwarded to the optical MUX 436, where they are recombined to form the forward signal 433 that is delivered via a fiber link to the LEO-to-LEO LCT head 420-1. The second set of the seven beams are dumped into optical loads 406. Out of the seven beams from the optical DEMUX 434, a first beam is forwarded to the forward optical RX block 450 and the other six beams are sent to six of the optical beam splitters 402, where each of the six beams are split into two sets of six beams. The first set of the six beams is forwarded to the optical MUX 436, where they are recombined to form the forward signal 433 that is delivered via a fiber link to the LEO-to-LEO LCT head 420-1. The second set of the six beams are dumped into optical loads 406.

The return optical ring multiplexer 440 includes seven optical beam splitters 404, an optical DEMUX 442 and optical MUXes 444 and 446. The optical DEMUX 442 receives the return signal 443 from the LEO-to-LEO LCT head 420-1 and separates the seven wavelengths contained in the return signal 443 into seven optical beams, of which a seventh beam is dumped into an optical load 408. The other six optical beams are directed to six of the optical beam splitters 404, where the six beams are split into two sets of six beams. The first set of the six beams is forwarded to the optical MUX 444, the second set of the six beams is forwarded to the optical MUX 446. Meanwhile, a seventh optical beam splitter receives an optical beam 448 from the return optical TX block 454. The optical beam splitter splits optical beam 448 into two beams, the first of which is directed to optical MUX 444 and the second of which is directed to optical MUX 446. The optical MUX 444 receives the seven optical beams from the optical beam splitters 404 and combines them to form the return signal 445 for transmission via a fiber link to the LEO-to-LEO LCT head 420-2. The optical MUX 446 also receives the seven optical beams from the optical beam splitters 404 and combines them to form the return signal 447 for transmission via a fiber link to the LEO-to-GEO LCT head 410.

The forward optical RX block 450 converts the received forward beam from the optical DEMUX 438 into an electrical signal (i.e. digital signal) and transmits the electrical signal to the communication processor 452.

The return optical TX block 454 converts a received return electrical signal (i.e. digital signal) from the communication processor 452 into an optical beam that is directed to one of the seven optical beam splitters.

The LCT connections architecture 400 is designed to add (or transmit) and terminate a return optical wavelength containing high data rate (e.g., 20 GBPS) information, and pass six other return optical wavelengths each containing high data rate (e.g., 20 GBPS) information in frequency band $f_1$. The LCT connections architecture 400 is also designed to receive a forward optical wavelength containing high data rate (e.g., 20 GBPS) information and pass six other forward optical wavelengths each containing high data rate (e.g., 20 GBPS) information in frequency band $f_2$. The Dense Wavelength Division Multiplexing (DWDM) standard could be used to select the frequency bands $f_1$ and $f_2$ and the wavelengths that each contain.

Figure 8:
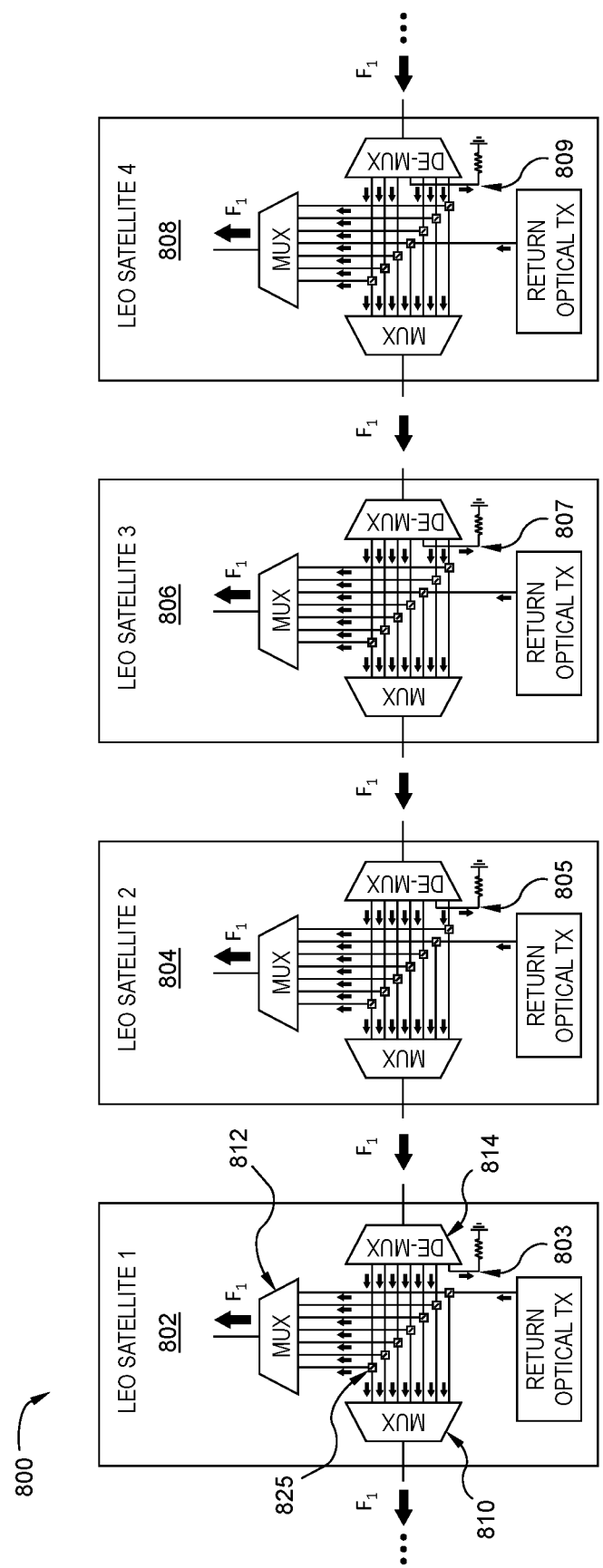
FIG. 8 is a schematic diagram illustrating a LEO-to-LEO return optical aggregation architecture, according to certain aspects of the disclosure.
Figure 9:
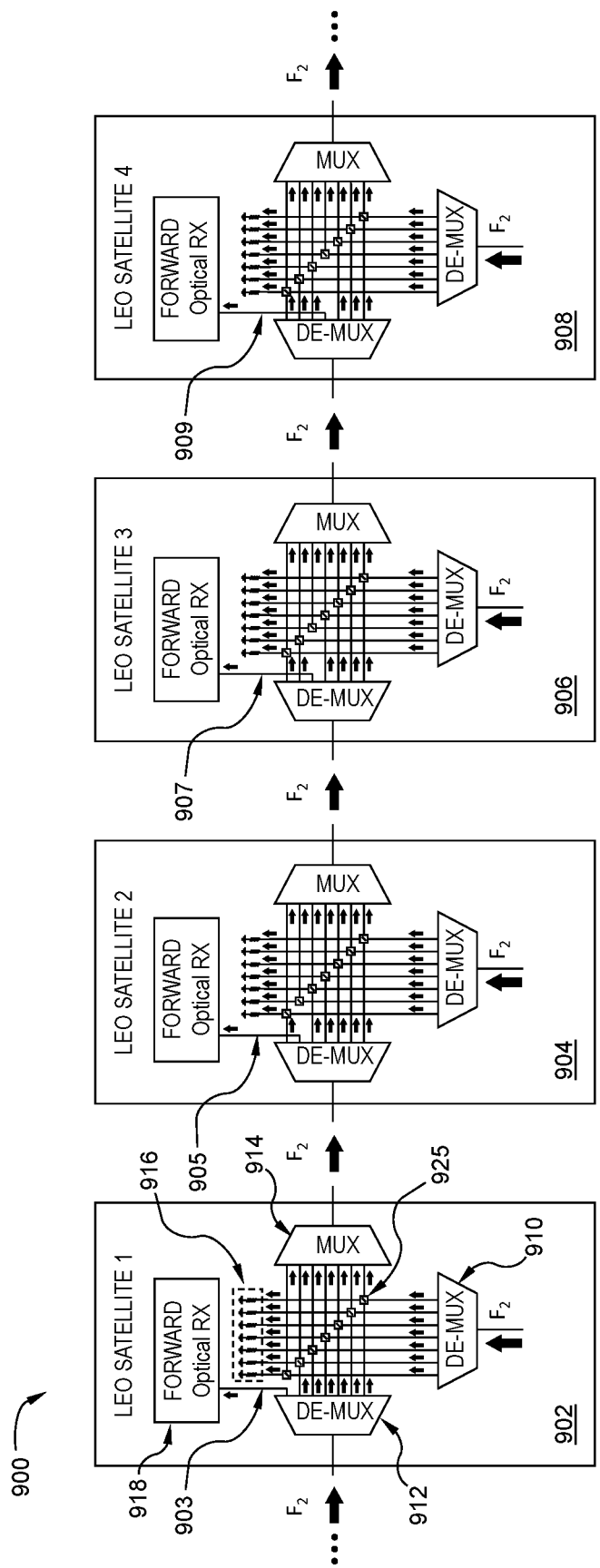
FIG. 9 is a schematic diagram illustrating a LEO-to-LEO forward optical disaggregation architecture, according to certain aspects of the disclosure.

It should be noted that the LCT connections architecture 400 as shown in FIG. 4A is hard-wired differently for each LEO satellite in a constellation of connected satellites as shown in FIG. 8 and FIG. 9. This is done for illustrative purposes to make clear the operations of aggregation of return links and disaggregation of forward links. For actual implementation, it would be advantageous to have all LEO communications payloads physically identical. FIG. 4B shows how the LCT connections architecture 400 can be modified to make all the LEO communications payloads physically identical.

Figure 4B:
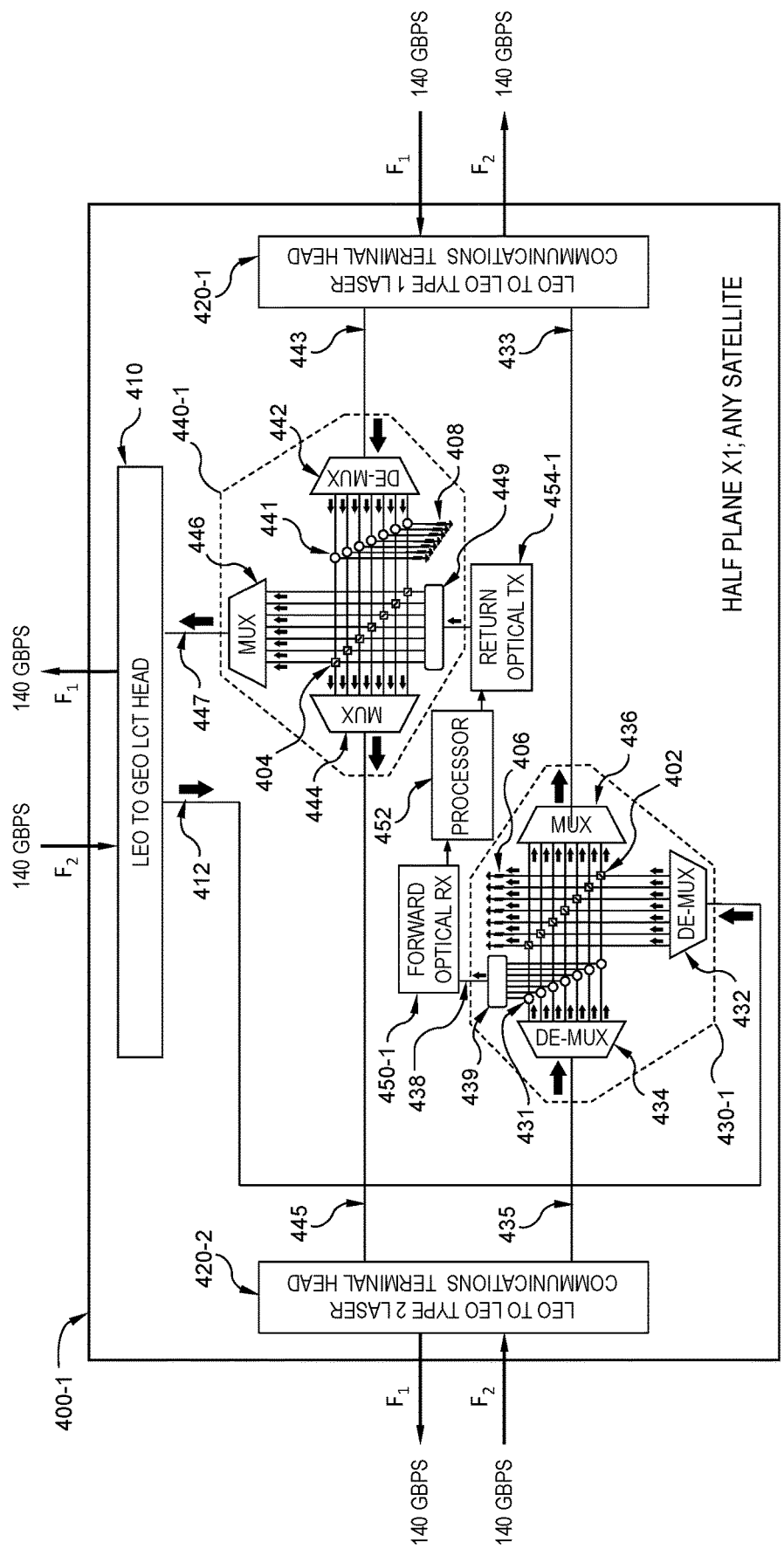
FIG. 4B is a schematic diagram illustrating a LEO spacecraft communications payload laser communications terminal (LCT) connections architecture with tunable optical aggregation and/or disaggregation, according to certain aspects of the disclosure.

FIG. 4B is a schematic diagram illustrating a LEO spacecraft communications payload, and an LCT connections architecture 400-1 with tunable optical aggregation and/or disaggregation, according to certain aspects of the disclosure. LCT connections architecture 400-1 has all the same components as LCT connections architecture 400 plus the addition of optical switching to make all LEO communications payloads physically identical. LCT connections architecture 400-1 adds seven 1:2 optical switches 431 and one 7:1 optical switch 439 to the forward optical ring MUX 430 to create the switchable forward optical ring MUX 430-1. The switchable forward optical ring MUX 430-1 in combination with a tunable forward optical receiver 450-1 allows selection of any one of the 7 wavelengths for receiving by property setting the switches and tuning the receiver. LCT connections architecture 400-1 adds seven 1:2 optical switches 441 and one 1:7 optical switch 449 to the return optical ring MUX 440 to create the switchable return optical ring MUX 440-1. The switchable return optical ring MUX 440-1 in combination with a tunable return optical transmitter 454-1 allows selection of any one of the 7 wavelengths for transmitting by property setting the switches and tuning the transmitter.

Figure 5:
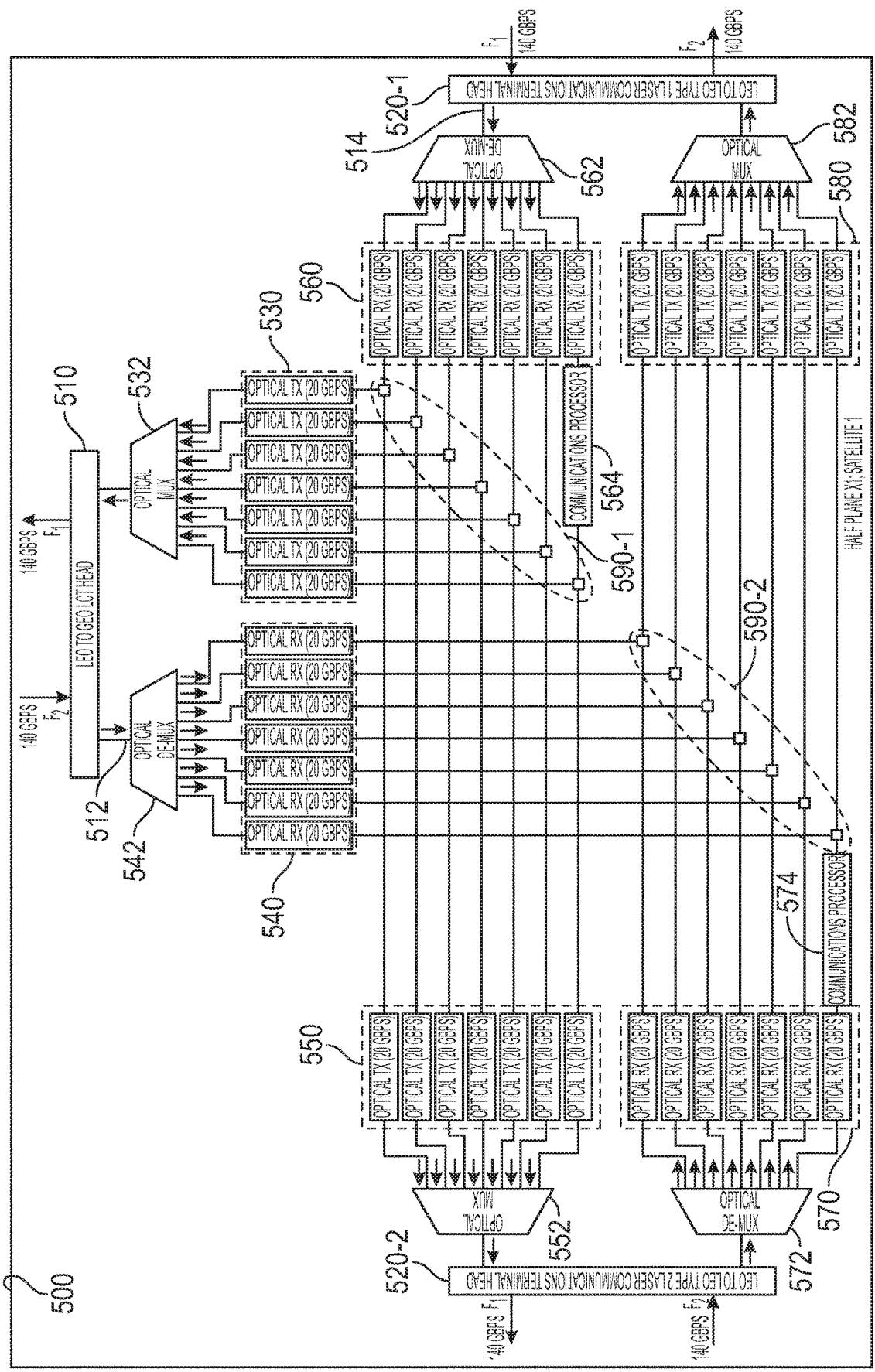
FIG. 5 is a schematic diagram illustrating a LEO spacecraft communications payload LCT connections architecture with digital aggregation and/or disaggregation, according to certain aspects of the disclosure.

FIG. 5 is a schematic diagram illustrating a LEO spacecraft communications payload LCT connection architecture 500 with digital aggregation and/or disaggregation, according to certain aspects of the disclosure. The LEO spacecraft payload LCT connection architecture 500 includes a LEO-to-GEO LCT head 510, LEO-to-LEO LCT heads 520-1 and 520-2, optical transmitters 530, 550, and 580, optical receivers 540, 560, and 570, optical MUXes 532, 552 and 582, optical DEMUXes 542, 562 and 572, digital signal splitters 590 (e.g., 590-1 and 590-2) and communication processors 564 and 574.

The functionalities of the LEO spacecraft payload LCT connection architecture 500 is similar to the functionalities of the LEO spacecraft LCT connections architecture 400, and the only differences are that the optical beam splitters are replaced with digital signal splitters 590 and the narrow band optical receivers 540, 560 and 570 are used to convert optical beams to digital signals and the narrow band optical transmitters 530, 550, and 580 are used to convert digital signals to optical beams. For example, optical transmitters 530, 550 and 580 each include seven optical TX converters that convert digital signals from the digital signal splitters 590 to optical beams that are combined by optical MUXes 532, 552 and 582, respectively. Optical receivers 540, 560 and 570 each include seven optical RX converters that convert optical beams received from optical DEMUXes 542, 562 and 572, respectively, into digital signals that are sent to the digital signal splitters 590.

The forward signal 512 is sent via optical DEMUX 542, to the optical receiver 540, then to the digital signal splitters 590-2, then to the optical transmitter 580 and optical MUX 582 and then to the LEO-to-LEO LCT head 520-1. The forward signal from the LEO-to-LEO LCT head 520-2 is sent via the DEMUX 572, to the optical receiver 570 and then to the digital signal splitters 590-2 and then to the optical transmitter 580, and from there to the optical MUX 582 for transmission over a fiber link to the LEO-to-LEO LCT head 520-1. Similarly, the return signal 514 from the LEO-to-LEO LCT heads 520-1 is sent through the optical DEMUX 562, then to the optical receivers 560, then to the digital signal splitters 590-1, and from there to optical transmitters 530 and 550 and optical MUXes 532 and 552 for transmission over fiber links to the LEO-to-GEO LCT heads 510 and the LEO-to-LEO LCT heads 520-2, respectively.

Communication processor 574 receives the forward digital signal intended for the LEO spacecraft. Communication processor 564 transmits the return digital signal of the LEO spacecraft.

Note that the LEO spacecraft payload LCT connection architecture 500 is a "regenerative" repeater for all forward and return signals. "Regenerative" means all forward and return signals are demodulated and re-modulated in the LEO spacecraft. This is opposed to LEO spacecraft payload LCT connection architecture 400 (see FIG. 4A), which is not regenerative for all forward and return signals that are passed through the LEO spacecraft. LEO spacecraft payload LCT connection architecture 400 (See FIG. 4A) is commonly referred to as a "bent pipe" repeater. The LEO spacecraft payload LCT connection architecture 400 (See FIG. 4A) and 500 are functionally equivalent. The LEO spacecraft payload LCT connection architecture 400 (See FIG. 4A) implements the forward ring MUX 430 (See FIG. 4A) optically and implements the return ring MUX 440 (See FIG. 4A) optically. The LEO spacecraft payload LCT connection architecture 500 implements functionality of the forward ring MUX digitally and implements functionality of the return ring MUX digitally.

Figure 6:
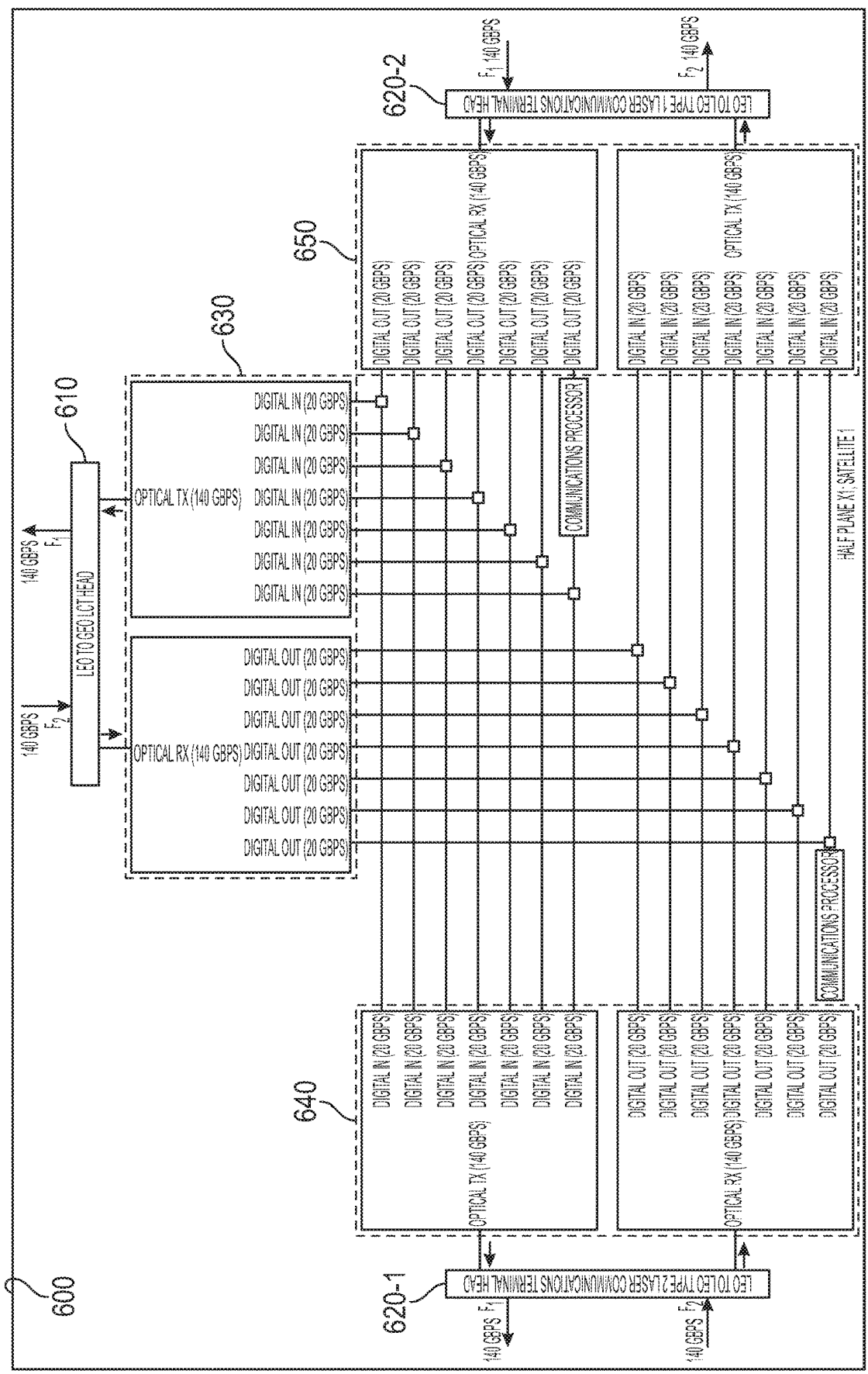
FIG. 6 is a schematic diagram illustrating a LEO spacecraft communications payload LCT connections architecture with digital aggregation and/or disaggregation using high data rate transmitters and receivers, according to certain aspects of the disclosure.

FIG. 6 is a schematic diagram illustrating a LEO spacecraft communications payload LCT connections architecture 600 with digital aggregation and/or disaggregation using high data rate transmitters and receivers, according to certain aspects of the disclosure. The LEO spacecraft LCT connections architecture 600 is similar in function to the LEO spacecraft LCT connections architecture 500, except that functionalities of the optical MUXes and DEMUXes are incorporated into the wide band optical transmitters and receivers (transceivers) 630, 640 and 650, which act as high-data-rate MODEMs. The LEO-to-GEO LCT head 610 and the LEO-to-LEO LCT heads 620-1 and 620-2 are similar to the LEO-to-GEO LCT head 510 and the LEO-to-LEO LCT heads 520-1 and 520-2, respectively.

The LEO spacecraft payload LCT connection architecture 600 implements functionality of the forward ring MUX digitally and implements functionality of the return ring MUX digitally.

Figure 7:
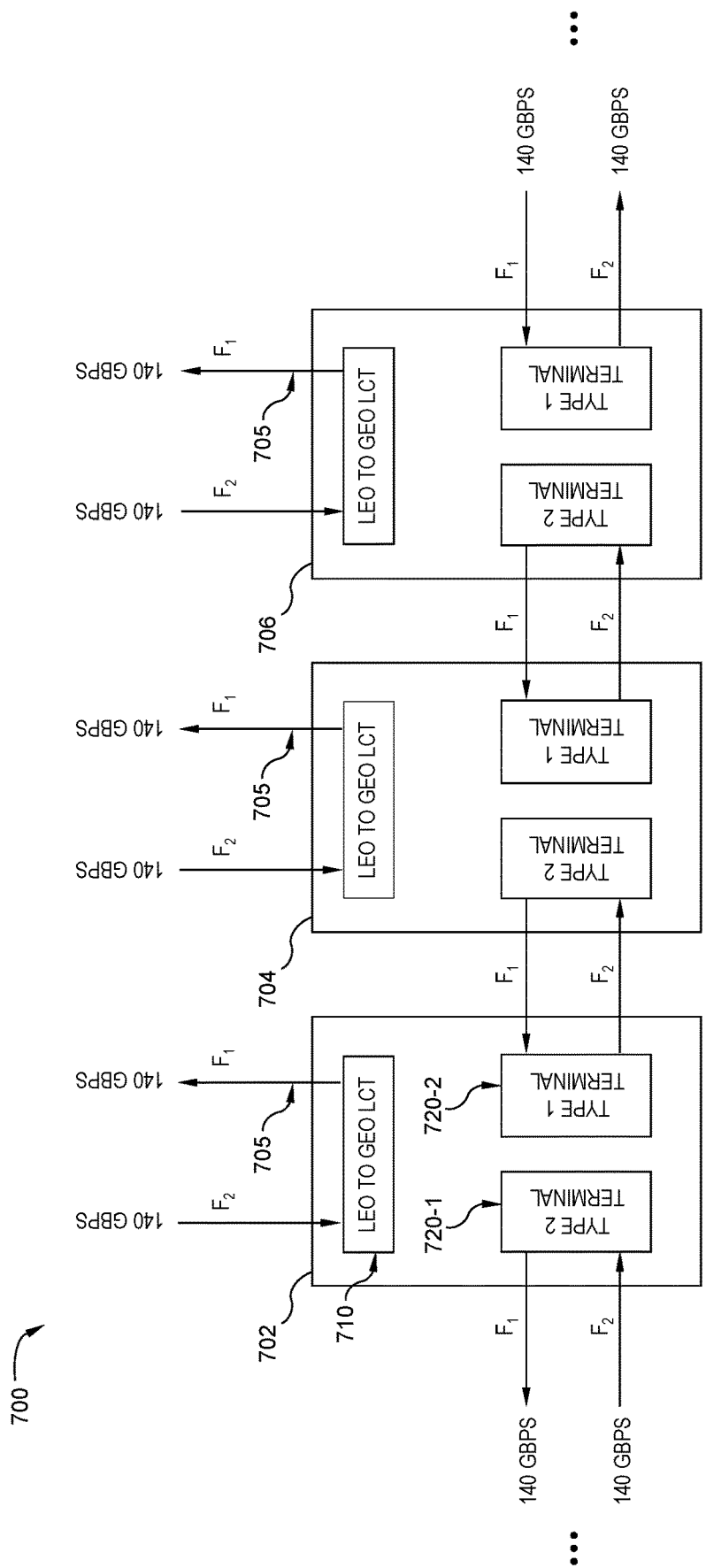
FIG. 7 is a schematic diagram illustrating a LEO-to-LEO spacecraft connection architecture, according to certain aspects of the disclosure.

FIG. 7 is a schematic diagram illustrating a LEO-to-LEO spacecraft connection architecture 700, according to certain aspects of the disclosure. The LEO-to-LEO spacecraft connection architecture 700 includes three similar LEO circuits 702, 704 and 706 of three LEO spacecraft. For example, the LEO circuits 702 includes LEO-to-GEO LCT head 710 and the LEO-to-LEO LCT heads 720-1 and 720-2, which are similar to the LEO-to-GEO LCT head 510 and LEO-to-LEO LCT heads 520-1 and 520-2 of FIG. 5. The purpose of FIG. 7 is to indicate that while all LEO spacecraft of a LEO constellation in a LEO plane include the LEO-to-GEO LCT head 710, and the aggregated return signals (e.g., 140 Gbps) 705 are available to them, only for the LOS-LEO (e.g., 315 of FIG. 3) that is in line of sight (LOS) view of the GEO spacecraft (e.g., 320 of FIG. 3) is the return signal on; and for the rest of the LEO spacecraft that are not in view of the GEO spacecraft, the return signal is off. This allows the non-LOS-LEO spacecraft to save power by turning off their respective fiber amplifiers.

FIG. 8 is a schematic diagram illustrating a LEO-to-LEO return optical aggregation architecture 800, according to certain aspects of the disclosure. The LEO-to-LEO return optical aggregation architecture 800 includes similar LEO spacecraft (satellites) 802, 804, 806, and 808, each including optical MUXes 810 and 812, an optical DEMUX 814 and optical beam splitters 825. In each LEO spacecraft a return optical signal from a respective return optical TX block replaces a respective optical beam from an optical DEMUX. For example, in LEO spacecraft 802, 804, 806, and 808, the optical beams 803, 805, 807 and 809 from the respective DEMUXes are dumped into optical loads, and corresponding optical signals from respective return optical TX blocks are directed to a respective optical beam splitters (e.g., 825). It is understood that only the optical amplifier of the LEO-to-GEO LCT head of the LEO spacecraft that is in view of the GEO spacecraft is turned on, and, for other LEO spacecraft, the respective optical amplifiers of the LEO-to-GEO LCT heads are turned off.

Note that for LEO spacecraft 802, 804, 806, and 808, the optical beams 803, 805, 807 and 809 are at different wavelengths. Therefore, the return data from a LEO spacecraft in a LEO constellation is uniquely identified by wavelength. The aggregation of return data from multiple LEO spacecraft is accomplished by wavelength division multiplexing.

FIG. 9 is a schematic diagram illustrating a LEO-to-LEO forward optical disaggregation architecture 900, according to certain aspects of the disclosure. The LEO-to-LEO forward optical disaggregation architecture 900 includes similar LEO spacecraft (satellites) 902, 904, 906, and 908, each including optical DEMUXes 910 and 912, an optical MUX 914 and optical beam splitters 925. In each LEO spacecraft a forward optical signal from a respective optical DEMUX (e.g., 912) is directed to a forward optical RX block instead of being directed to a respective optical beam splitter (e.g. 925). For example, in LEO spacecraft 902, 904, 906 and 908, the optical beams 903, 905, 907 and 909 from the respective DEMUXes (e.g., DEMUX 912) are directed to respective forward optical RX blocks (e.g., 918) instead of being directed to a respective optical beam splitters (e.g. 925). The other six forward beams from respective DEMUXes (e.g., DEMUX 912) are directed to respective optical beam splitters (e.g. 925) and then to a respective optical MUXes (e.g., MUX 914) and respective optical loads (e.g. 916). It is understood that forward signals coming from the LEO-to-GEO LCT head to the optical DEMUXes (e.g., 910) are available to the respective LEO spacecraft (e.g., 902) when that LEO spacecraft is in view of the GEO spacecraft. When this occurs, the seven forward beams from respective DEMUXes (e.g., DEMUX 910) are directed to respective optical beam splitters (e.g. 925) and then to a respective optical MUXes (e.g., MUX 914) and respective optical loads (e.g. 916).

Note that for LEO spacecraft 902, 904, 906, and 908, the optical beams 903, 905, 907 and 909 are at different wavelengths. Therefore, the forward data to a LEO spacecraft in a LEO constellation is uniquely identified by wavelength. The disaggregation of forward data to multiple LEO spacecraft is accomplished by wavelength division de-multiplexing.

FIGS. 10A, 10B, 10C and 10D are schematic diagrams illustrating a fiber collimator 1000, a beam splitter 1010, a bidirectional splitter configuration 1020 and a corresponding operational scheme 1030, according to certain aspects of the disclosure. The fiber collimator 1000 includes a fiber 1002, a boot 1004, a housing 1006, a pigtailed ferrule 1008 and a graded-index (GRIN) lens 1009. The beam splitter 1010 includes two optical pieces 1013 and 1012 coupled via a translucent cement 1018. A surface 1016 includes back scattering (BS) coating, and surfaces 1012 and 1014 include antireflection (AR) coating.

Figure 10A:
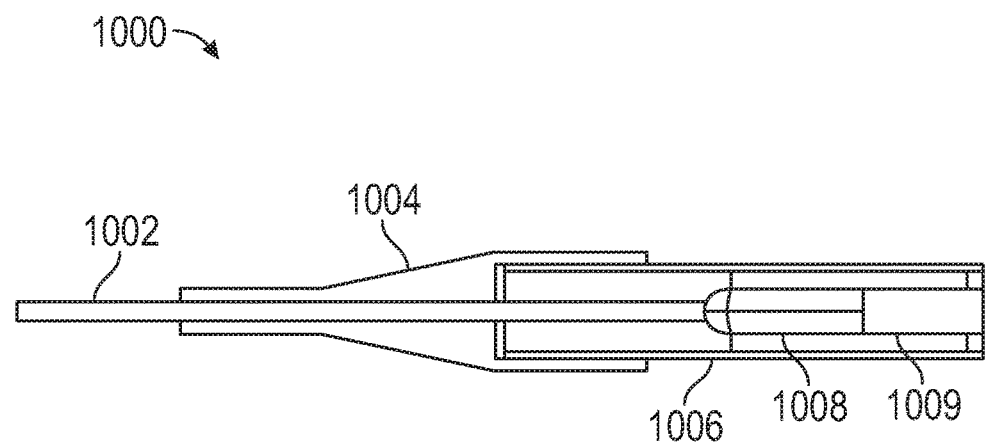
FIGS. 10A, 10B, 10C and 10D are schematic diagrams illustrating a fiber collimator, a beam splitter, a bidirectional splitter configuration and a corresponding operational scheme, according to certain aspects of the disclosure.
Figure 10B:
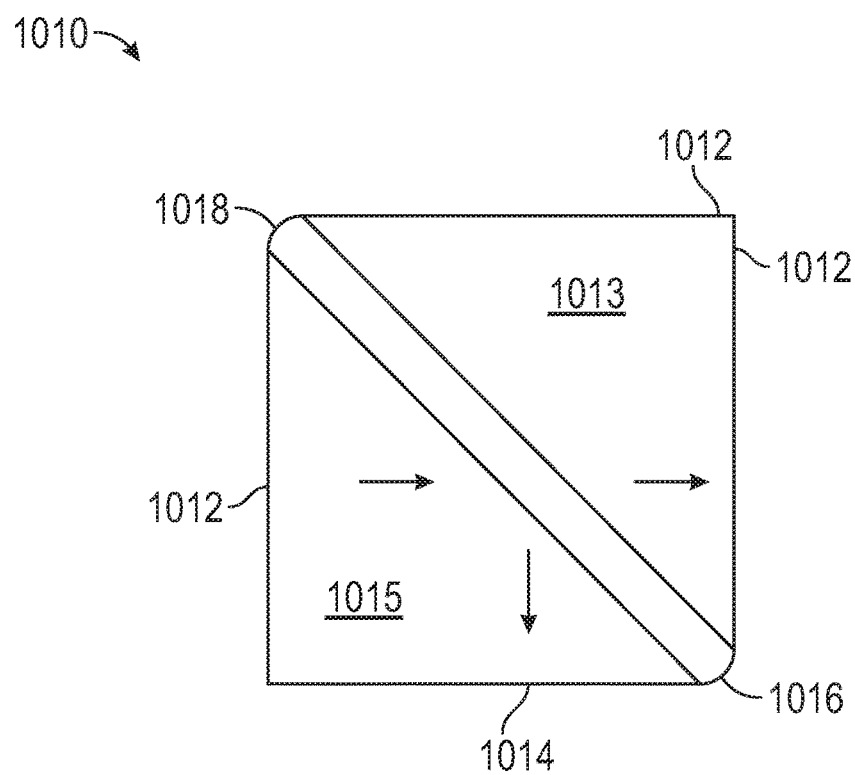
Figure 10C:
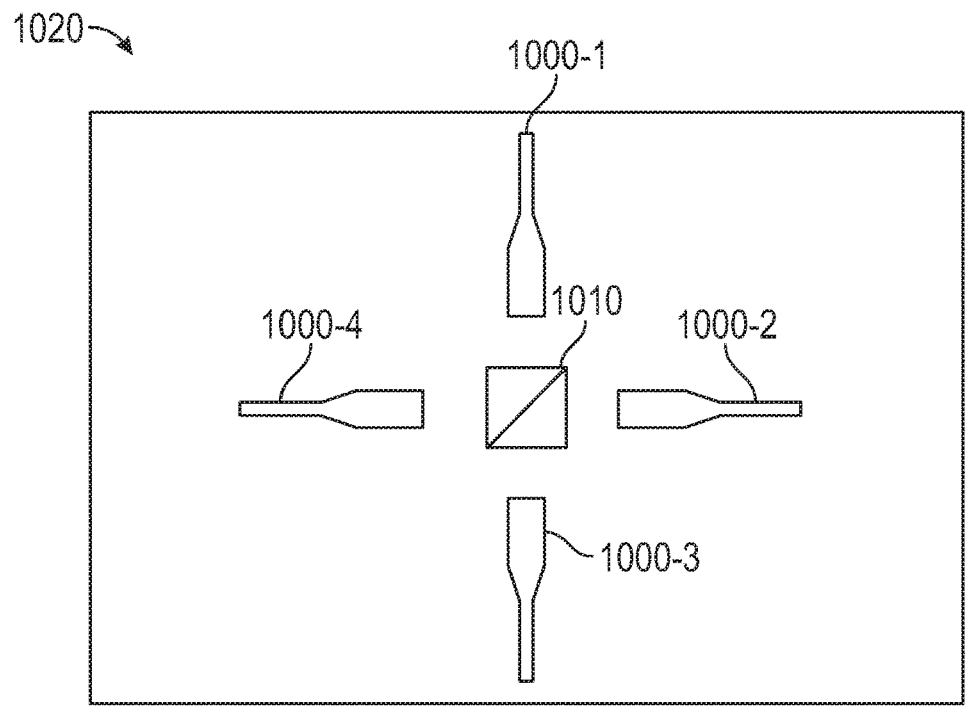
Figure 10D:
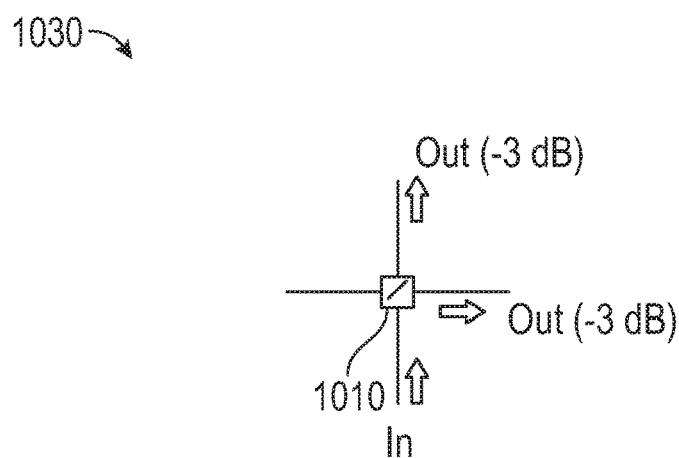
Figure 10D:
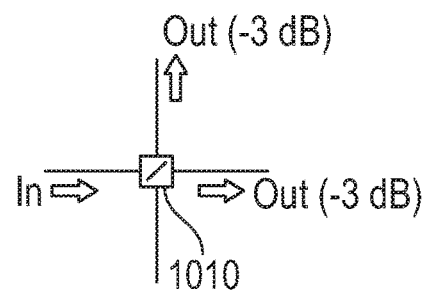

The bidirectional splitter configuration 1020 includes the beam splitter 1010 and four fiber collimators 1000-1, 1000-2, 1000-3 and 1000-4 with their respective GRIN lenses facing the beam splitter 1010. The corresponding operational scheme 1030 indicates that the beam splitter 1010 can split optical beams coming from two different directions and direct the split beams (e.g., −3 dB) to the same directions. FIG. 10C shows an example of an implementation of one of the optical beam splitters 925 of FIG. 9 and of one of the optical beam splitters 825 of FIG. 8.

It should be apparent to those skilled in the art that aggregating return signals from multiple LEO spacecraft in a LEO plane can be accomplished optically as in FIG. 4A and FIG. 4B or digitally as in FIG. 5 and FIG. 6. It should also be apparent to those skilled in the art that dis-aggregating forward signals to multiple LEO spacecraft in a LEO plane can be accomplished optically as in FIG. 4A and FIG. 4B or digitally as in FIG. 5 and FIG. 6.

Figure 11:
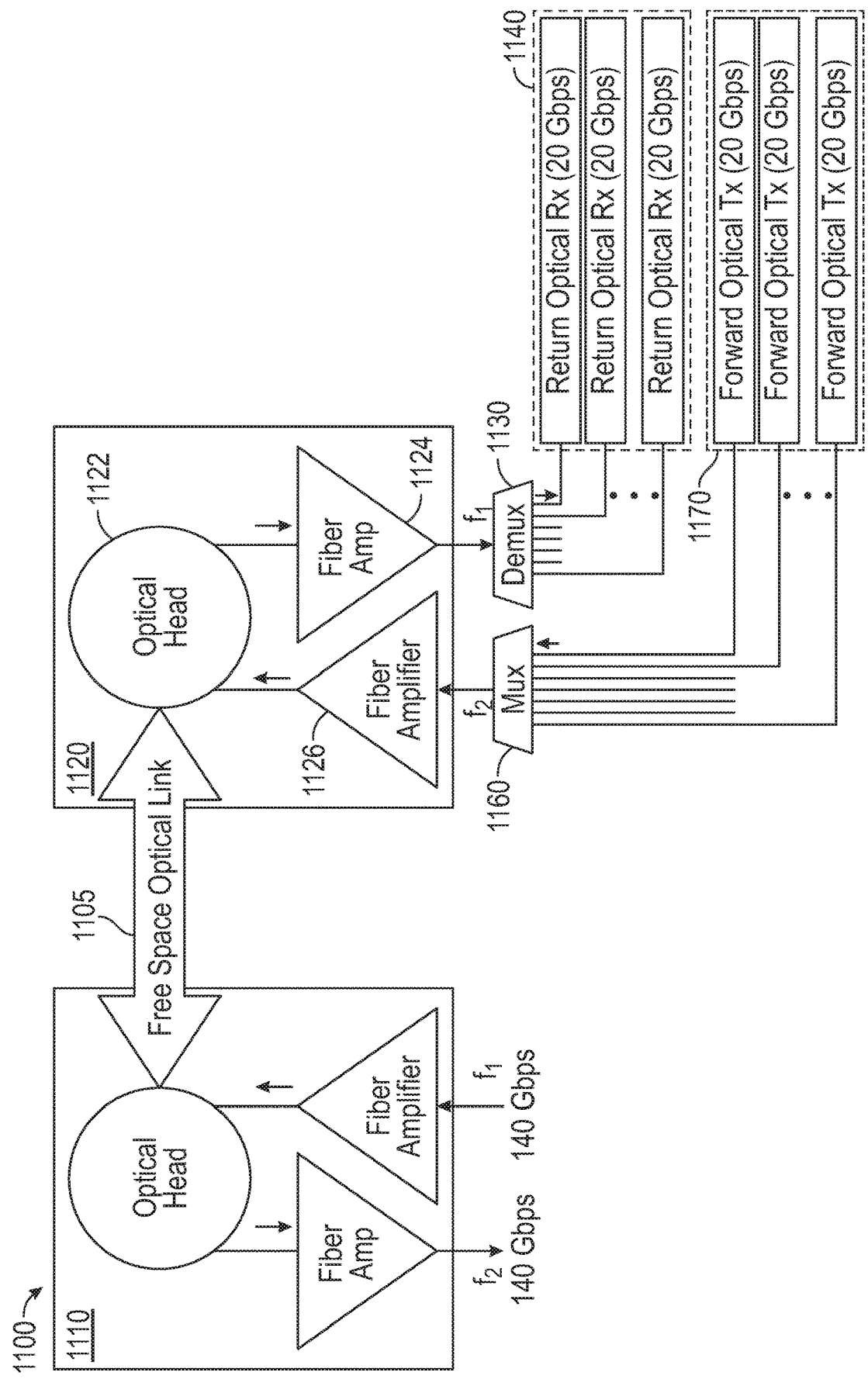
FIG. 11 is a schematic diagram illustrating a LEO-to-GEO connection architecture, according to certain aspects of the disclosure.

FIG. 11 is a schematic diagram illustrating a LEO-to-GEO connection architecture 1100, according to certain aspects of the disclosure. The LEO-to-GEO connection architecture 1100 includes LEO-to-GEO LCT heads 1110 and 1120 coupled to each other via an FSO link 1105. The LEO-to-GEO LCT head 1110 is on a LEO spacecraft and the LEO-to-GEO LCT head 1120 is on a GEO spacecraft. The LEO-to-GEO LCT heads 1110 and 1120 are similar in structure and include, for example, an optical head (e.g., a telescope) 1122 and fiber amplifiers 1124 and 1126. The optical heads are coupled via the FSO link 1105 and are also coupled to fiber amplifiers (e.g., 1124 and 1126). The LEO-to-GEO LCT head 1110, on the LEO spacecraft, transmits return signals at a frequency $f_1$ to the GEO spacecraft, and receives forward signals at a frequency $f_2$ from the GEO spacecraft. The LEO-to-GEO LCT head 1120, on the GEO spacecraft, receives return signals at $f_1$ from the LEO spacecraft and transmits forward signals at frequency $f_2$ to the LEO spacecraft. The LEO-to-GEO LCT head 1120 sends the received return signal, at a frequency $f_1$, by the fiber to fiber amplifier 1124, and then to optical DEMUX 1130. The LEO-to-GEO LCT head 1120 also receives the forward signal at a frequency $f_2$ from fiber amplifier 1126, which comes from optical MUX 1160. The optical MUX 1160 receives seven optical beams (e.g., at 20 Gbps data rate each) from forward optical TX blocks 1170, and the optical DEMUX 1130 transmits seven optical beams (e.g., at 20 Gbps data rate each) to return optical RX blocks 1140. Each of the forward optical TX blocks 1170 and the return optical RX blocks 1140 are in the GEO spacecraft. A GEO spacecraft can have multiple LEO-to-GEO LCT heads and therefore receive return signals from multiple LOS LEO spacecraft from multiple LEO constellations (e.g. 4 LOS LEO spacecraft from 4 LEO constellations). These return signals can be converted into multiple down link data streams 112 of FIG. 1A that connect to multiple ground gateways 130 of FIG. 1A. These data streams can be RF signals or optical signals. The GEO spacecraft can receive multiple uplink data streams 112 of FIG. 1A that contain multiple forward signals. These forward signals can be aggregated and sent to multiple LOS LEO spacecraft from multiple LEO constellations (e.g. 4 LOS LEO spacecraft from 4 LEO constellations).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject invention.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject invention. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. For instance, the number of channels (e.g., seven) in the multiplexers (MUX) and Demultiplexers shown in FIG. 4A, FIG. 4B, FIG. 5, FIG. 6, FIG. 8, FIG. 9. This number can vary (e.g., 5 channels, 14 channels, etc.) and equals the number of LEO spacecraft that are connected in a LEO constellation. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A forward data distribution network for low-earth orbit (LEO) constellations, the forward data distribution network comprising:
   a plurality of LEO constellations, each including a plurality of LEO spacecraft orbiting in a LEO plane, wherein each LEO spacecraft of the plurality of LEO spacecraft further includes:
   a return optical transmit block configured to optically transmit signals to at least one geostationary earth orbit (GEO) spacecraft;
   a communication processor configured to transmit signals to the return optical transmit block;
   a forward optical receive block;
   a forward optical demultiplexer;
   a forward optical multiplexer; and optical beam splitters, wherein the forward optical demultiplexer is configured to:
  receive a plurality of forward optical signals;
  direct a forward optical signal of the plurality of forward optical signals to the forward optical receive block, without being directed to the optical beam splitters,
  direct remaining forward optical signals of the plurality of forward optical signals from the forward optical demultiplexer to the optical beam splitters, and
wherein the forward optical multiplexer is configured to recombine the remaining optical signals to generate forward data and distribute to the other LEO spacecraft;
wherein the forward optical receive block is configured to convert the received forward optical signal to an electrical signal and transmit the electrical signal to the communication processor, wherein the communication processor forwards the electrical signal to the return optical transmit block for transmission to the GEO spacecraft; and the at least one GEO spacecraft in communication with a plurality of ground gateways, the at least one GEO spacecraft is configured to:
  receive forward communication traffic including radio-frequency (RF) data streams uplinked from the plurality of ground gateways for different LEO spacecraft;
  convert the received forward communication traffic into an aggregated forward traffic; and
  downlink the aggregated forward traffic optically to line of sight (LOS) LEO spacecraft of each LEO constellation for being distributed to each LEO spacecraft in the LEO constellation in the LEO plane via the LOS LEO spacecraft of the LEO constellation.

2. The forward data distribution network of claim 1, wherein the LOS LEO spacecraft of each LEO constellation that receives the downlinked aggregated forward traffic is in view of the GEO spacecraft and is configured to pass the downlinked aggregated forward traffic to a respective LEO spacecraft of the plurality of LEO spacecraft of that LEO constellation in the LEO plane.

3. The forward data distribution network of claim 2, wherein each LEO spacecraft of the plurality of LEO spacecraft of each LEO constellation is configured to optically communicate LEO to LEO forward traffic.

4. The forward data distribution network of claim 3, wherein each LEO spacecraft of the plurality of LEO spacecraft in an LEO constellation includes a LEO-to-GEO laser communication terminal (LCT), a first LEO-to-LEO LCT and a second LEO-to-LEO LCT.

5. The forward data distribution network of claim 4, wherein each LEO constellation includes a plurality of LEO spacecraft, and a first LEO LCT of a first LEO spacecraft is in communication with a second LEO LCT of a second LEO spacecraft.

6. The forward data distribution network of claim 4, wherein the LEO-to-GEO LCT is configured to establish an optical communication link between that LEO spacecraft and a GEO spacecraft when it is in line of sight, wherein the optical communication link comprises a forward-optical link.

7. The forward data distribution network of claim 4, wherein each LEO spacecraft of the plurality of LEO spacecraft further includes a forward optical ring multiplexer to disaggregate and distribute forward data to all LEO spacecraft in the LEO constellation, wherein the forward optical ring multiplexer comprises an optical multiplexer, two optical demultiplexers and associated beam splitters and switches to dis-aggregate and distribute forward data optically as a bent pipe repeater.

8. The forward data distribution network of claim 1, wherein the forward optical multiplexer is implemented digitally using digital demodulation, digital routing, digital switching and digital modulation to disaggregate and distribute the forward data digitally as a regenerative repeater.

9. The forward data distribution network of claim 1, wherein the GEO spacecraft is a member of a GEO constellation including a plurality of GEO spacecraft, wherein each GEO spacecraft of the GEO constellation has line-of-sight (LOS) forward optical links with LOS LEO spacecraft in a plurality of LEO constellations in a plurality of LEO planes and also has line of sight forward RF links with a plurality of ground gateways.

10. The forward data distribution network of claim 1, wherein the GEO spacecraft is a member of a GEO constellation including a plurality of GEO spacecraft, wherein each GEO spacecraft of the GEO constellation has line-of-sight (LOS) forward optical links with LOS LEO spacecraft in a plurality of LEO constellations in a plurality of LEO planes and also has line of sight forward optical links with a plurality of ground gateways.

* * * * *